Oct. 26, 1948.   C. GOBEL   2,452,368
LINE TIGHTENER
Filed Sept. 7, 1944

Inventor
Charles Gobel
By Herbert S. Fairbanks
Attorney

Patented Oct. 26, 1948

2,452,368

UNITED STATES PATENT OFFICE 2,452,368

LINE TIGHTENER

Charles Gobel, Philadelphia, Pa.

Application September 7, 1944, Serial No. 553,006

2 Claims. (Cl. 254—67)

1

The object of this invention is to devise a novel line tightener which can be employed instead of a turnbuckle for placing a tension on a line or other parts.

A further object of the invention is to devise a body portion in the form of a tube exteriorly threaded and having one or more longitudinally extending slots opening through its periphery, and forming one of the line members. The other line member is in the form of a rod closely fitting the bore of the body portion and having a projection slidable in the slot. A nut cooperating with the threads on the tube abuts against the projection.

With the foregoing objects and other objects in view, as will hereinafter clearly appear, my invention comprehends a novel line tightener.

It further comprehends a novel body portion in the form of a slotted screw having novel tension members in the slot or slots which are adjusted on the body portion by means of nuts.

Other novel features of advantage and construction will be set forth in the description and the appended claims.

For the purpose of illustrating the invention, I have shown in the accompanying drawings a preferred embodiment thereof which I have found in practice to give satisfactory and reliable results. It is, however, to be understood that the various instrumentalities of which the invention consists can be variously arranged and organized, and the invention is not limited to the exact arrangement and organization of these instrumentalities as herein shown.

Similar numerals of reference indicate corresponding parts.

Figure 1:
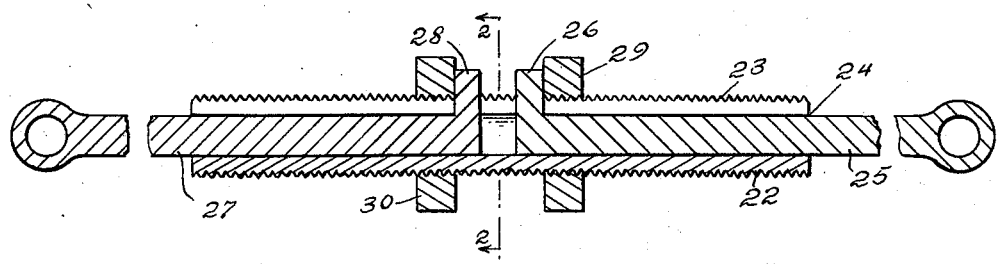
Figure 1 is a sectional elevation of a line tightener embodying my invention.
Figure 2:
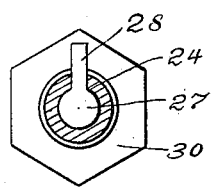
Figure 2 is a section on line 2-2 of Figure 1.

Referring to the drawings:

The slot in the screw may have any desired contour in cross section and in Figures 1 and 2 the screw is tubular and has a slot opening through its periphery. The body portion 22 is threaded at 23 and has a slot 24 extending longitudinally through it. A rod 25 slidable in the screw has a projection 26 slidable in the slot 24. A line member 27 has a projection 28. A nut 29 bears against the projection 29 and a nut 30 bears against the projection 28.

The manner in which my novel line tightener is employed will now be clear to those skilled in this art and is as follows:

2

When the nuts 29 and 30 are tightened a tension will be placed on the line as is apparent.

A line member and the body portion or the line members may be connected with different parts which are to be drawn together or towards each other or to the ends of the same member.

It will of course be understood that a washer may be placed between the projection and the nut.

Having thus described my invention, what I claim as new and desire to secure by Letters Patent is:

1. A line tightener, comprising a tube exteriorly threaded and having a longitudinally extending slot opening through its periphery and adapted for connection to a line, and a line connecting member in the form of a rod closely fitting the bore of the tube and having a projection extending through the slot, and a nut engaging the threads of the tube to adjust the position of said projection longitudinally of the tube.

2. In a line tightener, a tube exteriorly threaded and having a longitudinally slot opening through its periphery, a line connecting member in the form of a rod closely fitting the bore of the tube, extending through one end of the tube and having a projection extending through said slot, a nut engaging the threads of the tube to adjust the position of said projection longitudinally of the tube. a second line connecting member in the form of a rod closely fitting the bore of the tube, extending through the opposite end of the tube and having a projection extending through said slot, and a nut engaging the threads of the tube to position the projection of said second member longitudinally of the tube.

CHARLES GOBEL.

REFERENCES CITED

The following references are of record in the file of this patent:

UNITED STATES PATENTS

| Number | Name | Date |
| --- | --- | --- |
| 797,865 | Novachesky | Aug. 22, 1905 |
| 860,742 | Gregory | July 23, 1907 |
| 1,275,042 | Kirchhauber | Aug. 6, 1918 |
| 1,373,230 | Gainor | Mar. 29, 1921 |
| 1,901,168 | Kalben | Mar. 14, 1933 |

FOREIGN PATENTS

| Number | Country | Date |
| --- | --- | --- |
| 486,576 | France | Jan. 25, 1918 |